Figure 1:
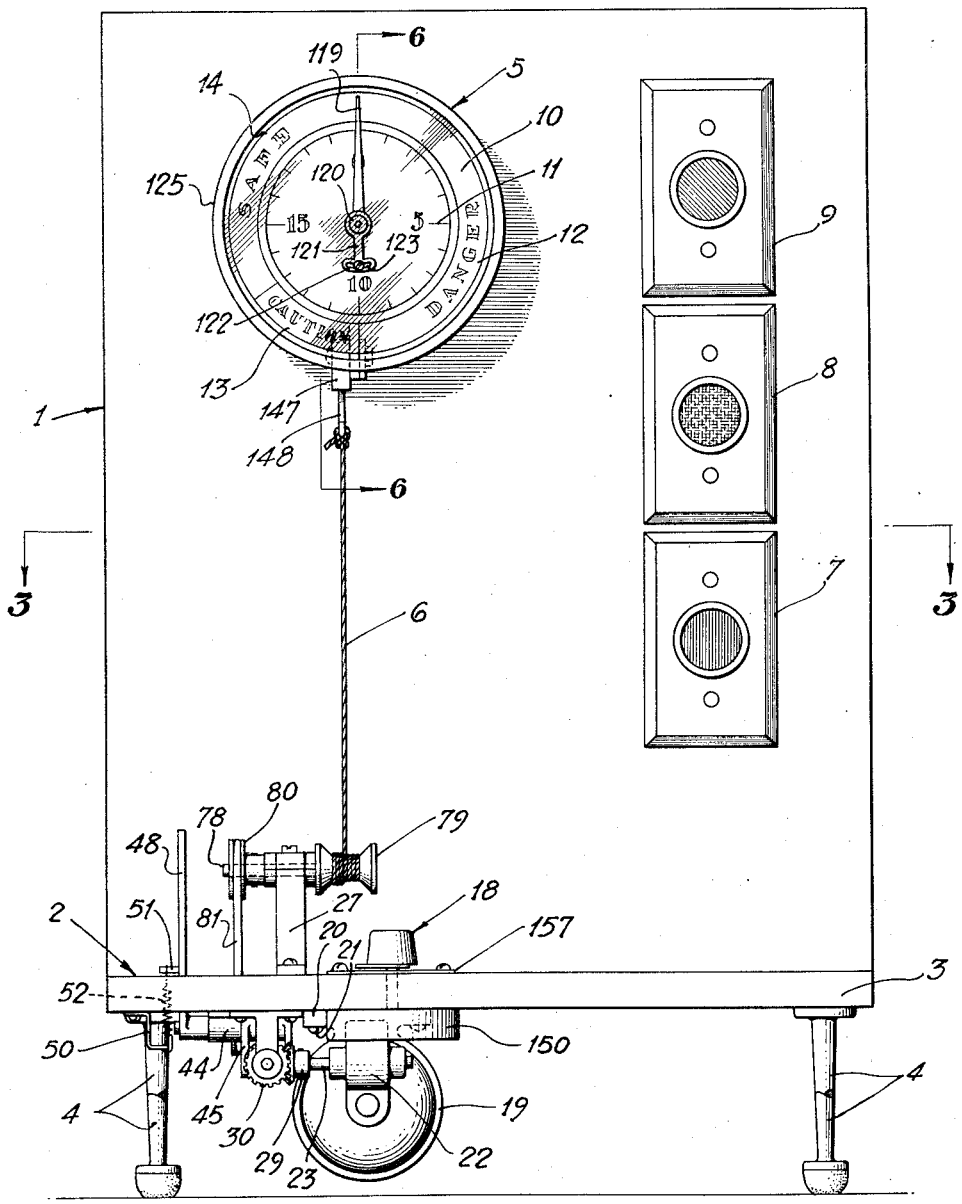

Oct. 8, 1940.                H. M. RUCH                 2,217,080
                    TIRE CORD DEMONSTRATION DEVICE
            Filed May 9, 1938              5 Sheets-Sheet 1

Herald M. Ruch,
INVENTOR

BY
ATTORNEY

Oct. 8, 1940.   H. M. RUCH   2,217,080
TIRE CORD DEMONSTRATION DEVICE
Filed May 9, 1938   5 Sheets-Sheet 2

Herald M. Ruch,
INVENTOR

BY (signature)
ATTORNEY

Oct. 8, 1940.  H. M. RUCH  2,217,080
TIRE CORD DEMONSTRATION DEVICE
Filed May 9, 1938  5 Sheets-Sheet 3

Herald M. Ruch,
INVENTOR
BY Calvin Brown
ATTORNEY

Oct. 8, 1940.   H. M. RUCH   2,217,080
TIRE CORD DEMONSTRATION DEVICE
Filed May 9, 1938   5 Sheets-Sheet 4

Herald M. Ruch
INVENTOR

BY
ATTORNEY

Oct. 8, 1940.  H. M. RUCH  2,217,080
TIRE CORD DEMONSTRATION DEVICE
Filed May 9, 1938  5 Sheets—Sheet 5

Herald M. Ruch,
INVENTOR.

BY
ATTORNEY

Patented Oct. 8, 1940

2,217,080

UNITED STATES PATENT OFFICE 2,217,080

TIRE CORD DEMONSTRATION DEVICE

Herald M. Ruch, Los Angeles, Calif.

Application May 9, 1938, Serial No. 206,830

4 Claims. (Cl. 35—49)

This invention relates to a demonstration device adapted to determine the tensile strength of cords used in a cord tire of the pneumatic type, including fabric cord, synthetic cord, or any tire cord used to make up the body or carcass of a pneumatic tire. Tire manufacturers often select an arbitrary figure for the tensile strength of a cord to be used in a pneumatic cord type tire. This figure is placed at 17 for any cord, which means that the cord under tension will break when there is a greater tensile pull than 17 pounds upon the cord.

The present invention includes among its objects a device which may compare a new cord of known characteristics with a cord taken from an old tire or a tire which has been run a definite number of miles. In this manner, it is possible to readily demonstrate by visual means to the tire user or the person the fatigue point of the used cord with respect to the new cord. A demonstration of tensile strength is very important because it has been found that the ability of the tire cord to resist road shock and bruising is in direct proportion to the tensile strength of the cord. Tire manufacturers, as a rule, know the effect of loss of tensile strength in a cord and for that reason, among others, often offer a trade-in value for the used tires so that the "unsafe" miles of any tire are supplanted with safe mileage through the purchase of new tires. Therefore, it is an object of the present invention to actually educate the tire user to the great advantage of checking his tires after a certain mileage. To do this all that need be done is to remove the tire from the wheel, properly deflate the same so that one of the cords from the inside surface of the tire may be removed. This does not affect the tire in the least. With this cord, a proper demonstration can be put on and the customer may for himself readily see the strength of the cord so removed.

As previously stated, the generally accepted value so far as tensile strength of a cord is concerned in all new cord tires after curing is 17 pounds. In the high pressure type of tire, the main object of the tire cord was to maintain the air. However, as speed of driving increased and greater riding ease was demanded, the balloon tire made its appearance and provided a low air pressure type of tire with a large cross-sectional diameter. This construction required greater flexibility of a tire cord. The balloon tire offered difficulty to manufacturers from many points, such as proper balancing of the tire, the flexing of the cord, and the question of tire cord fatigue. It is a known fact that pneumatic tires of large cross-sectional diameter, after being in service for a while actually increase in cross-sectional diameter. This is due to the fact that the tensile strength of the cord diminishes, resulting in a weaker tire and one not likely to stand up over any length of time when subjected to high speed driving, resulting in rapid flexibility together with the usual shocks incident to tires due to rough roads and bruises of various kinds. Within the inventor's experience, in the design and construction of tires covering a period of over fifteen (15) years, he has found that the average tensile strength of a cord tire diminishes after some 5,000 miles of driving, to a tensile strength of 15 pounds, and after 10,000 miles, the tensile strength has dropped to 12.

Another object of the invention is to provide a demonstration board which will show visually to the on-looker the exact condition of a cord in an old tire, will show the effect of rapid tensioning of cords in a pneumatic tire at various road speeds, and will further include novel means indicated by colored signals when the cord begins to diminish in tensile strength.

Further objects include various devices for carrying out the invention which are simple of construction, low in cost of manufacture, work accurately, give a convincing demonstration of a fatigue test, and which is compact, attractive in appearance, and creates a scientific interest in the problem presented.

With the above and other objects in view, the invention consists in the novel and useful provision, formation, construction, association, and relative arrangement of parts, members and features, all as shown in certain embodiments in the accompanying drawings, described generally, and more particularly pointed out in the claims.

Figures 2, 7:
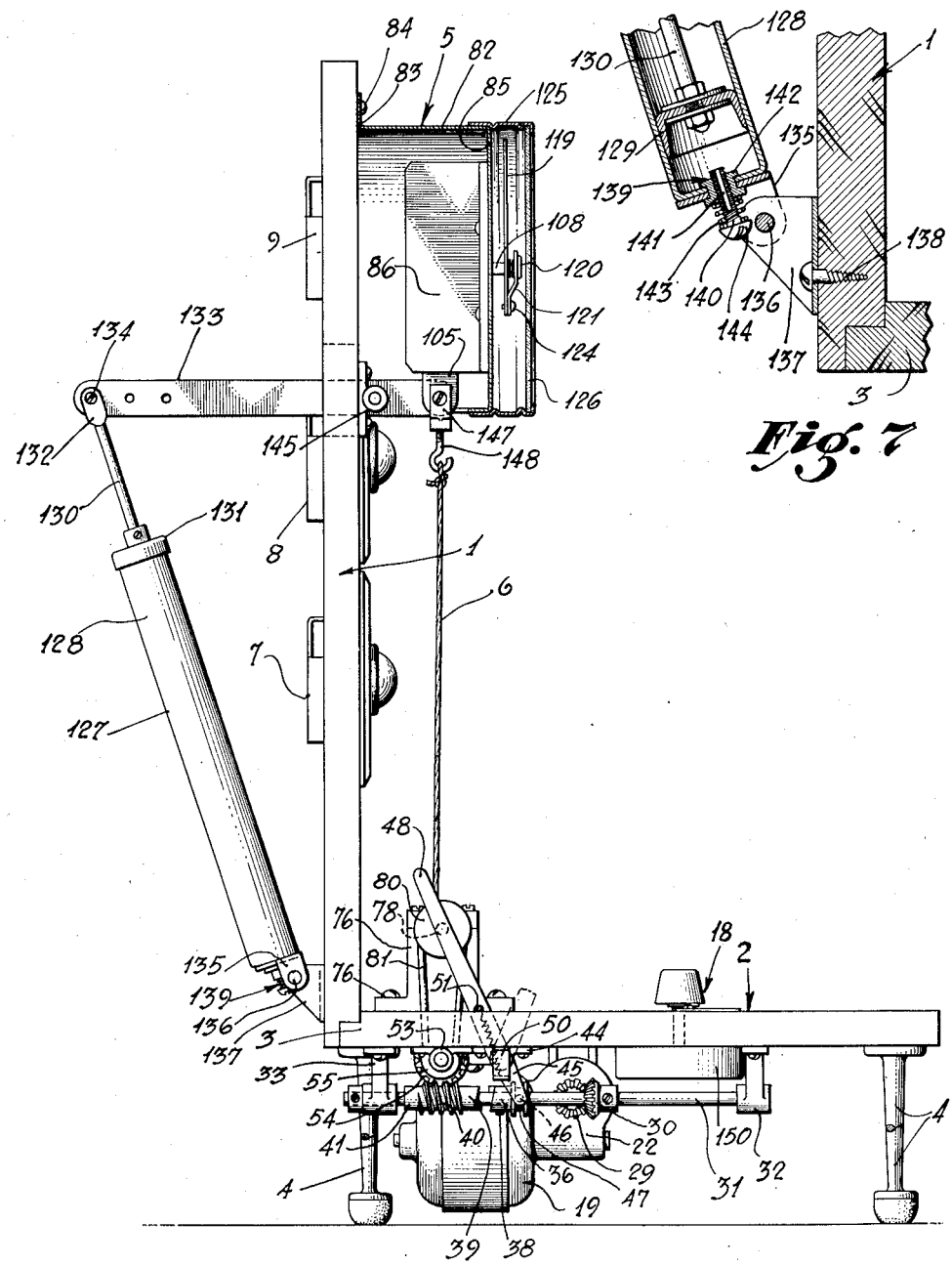
Figure 5:
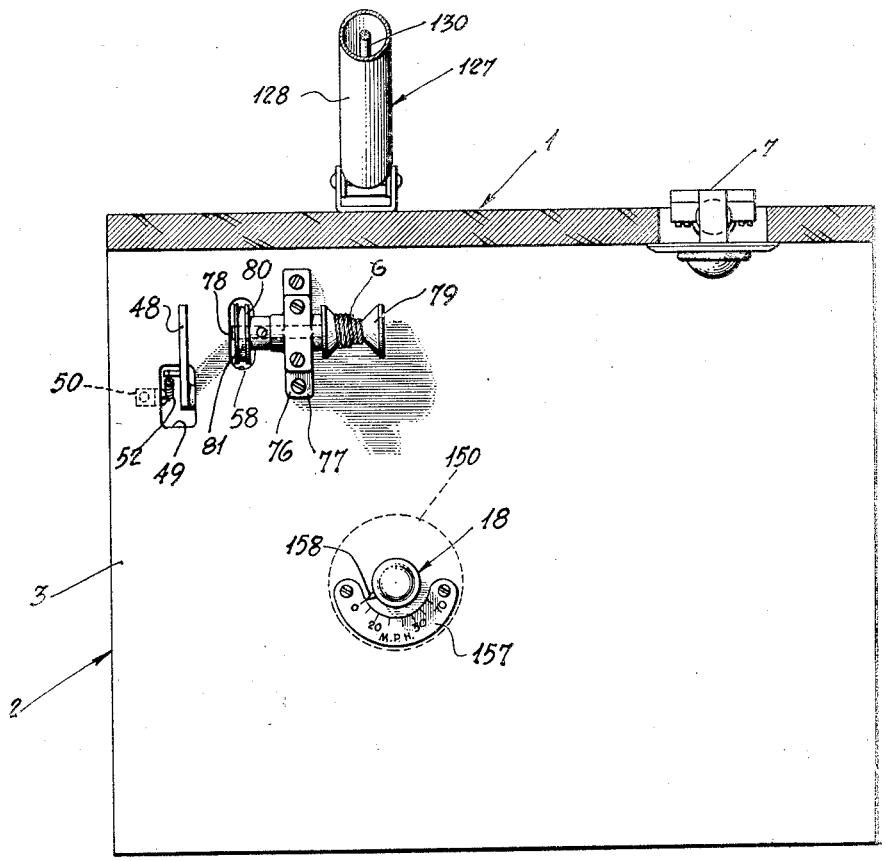
Figure 8:
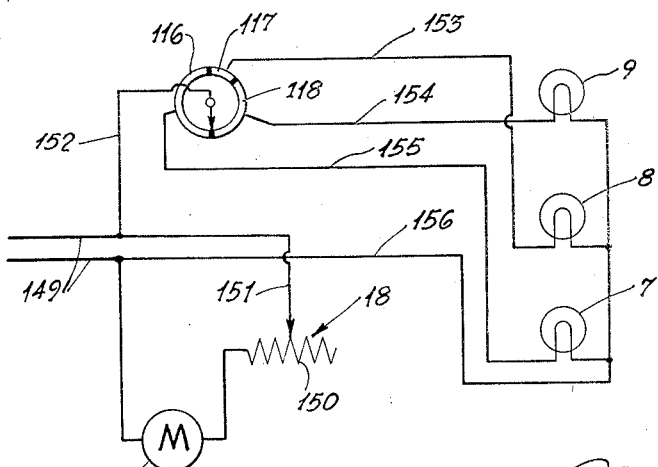
Figure 4:
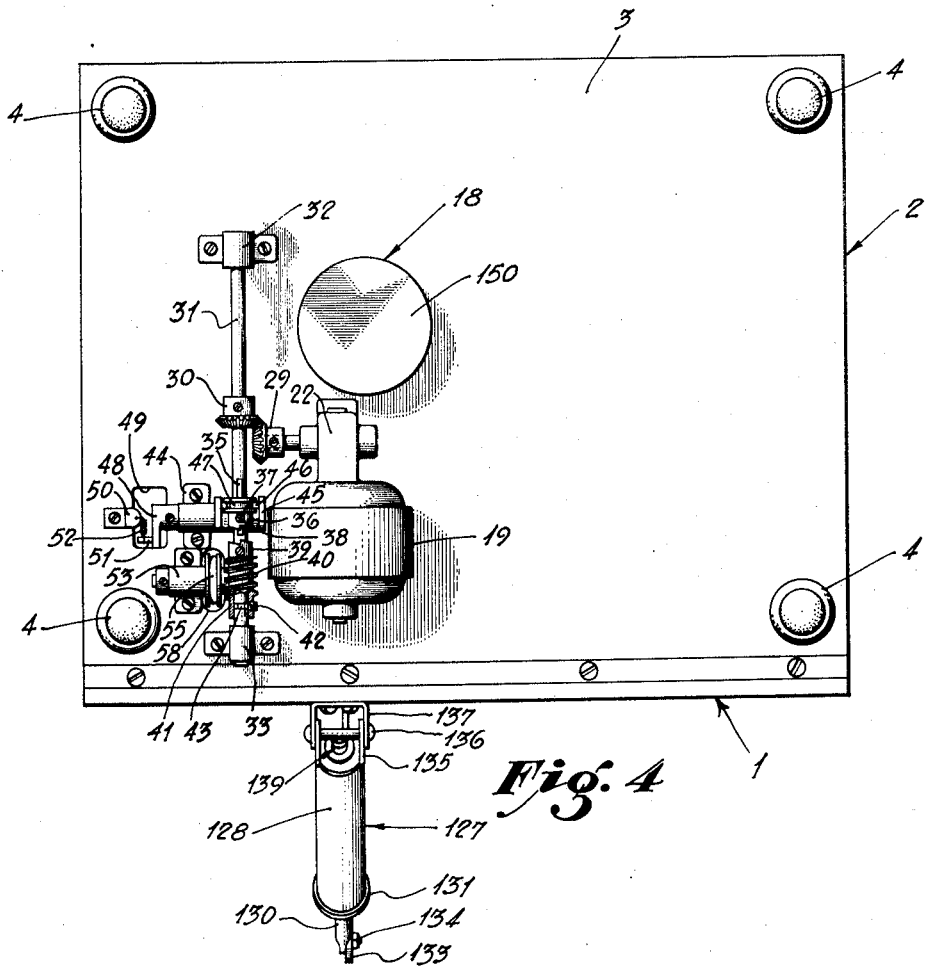
Figure 9:
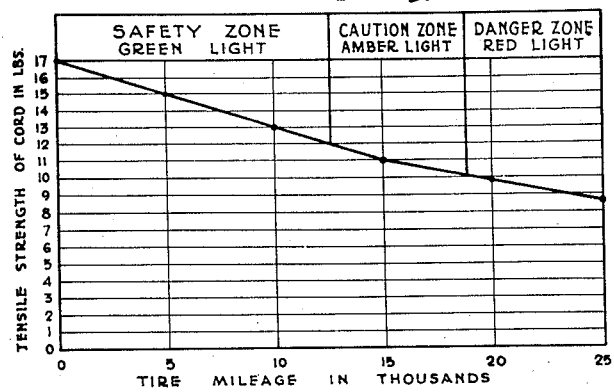
Figures 5, 6:
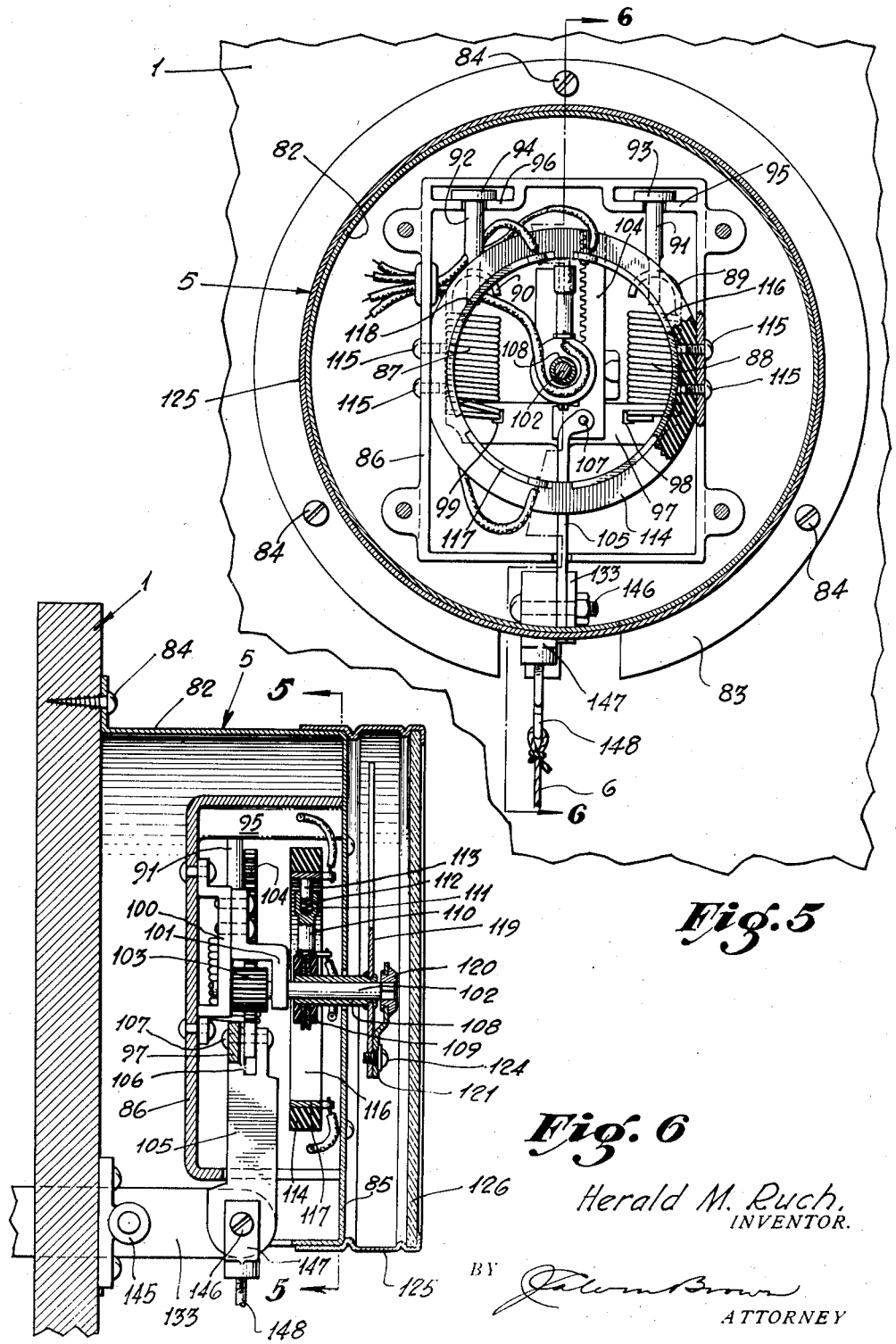

In the drawings:

Figure 1 is an elevation of my improved tire cord demonstration device shown as an entirety, Figure 2 is a side elevation of the device shown in Figure 1, Figure 3 is a sectional view on the line 3—3 of Figure 1, Figure 4 is a bottom plan view of the device shown in Figure 1, Figure 5 is a fragmentary sectional view on the line 5—5 of Figure 6, Figure 6 is a sectional view on the line 6—6 of Figure 5, Figure 7 is a fragmentary sectional view showing an element of the device, Figure 8 is a wiring diagram of an electrical circuit which may be employed in practicing the invention, and, Figure 9 is a graph diagram showing fatigue in a fabric cord after use over a given period of time.

Referring now with particularity to the drawings, the invention contemplates the use of a display board together with a supporting table, this display board having visual signals thereon and may likewise have charts secured thereto. By way of example, 1 may be the display board, 2 a table including the usual table top 3 supported by legs 4, a leg for each corner of the top. On this display board, I have arranged certain members, such as a dynamometer 5 adapted to show in pounds the pull upon a cord 6 under test. Also, there is included a series of colored lenses or incandescent bulbs within proper fittings, as shown at 7, 8, and 9. These lenses may be of different colors, as indicated by the drawings, such as red for 7, amber or yellow for 8, and green for 9. Thus, before the eye of the observer, we have a dynamometer and the different colored lights, and the dynamometer has its dial 10 graduated to indicate pounds, such as 5, 10, 15, etc., as shown for the graduations at 11, together with segregated zones bearing such indicia as "Danger" at 12, "Caution" at 13, and "Safe" at 14.

Beneath the table top, I have provided mechanism whereby the various devices depicted upon the display board 1 and upon the table top may be placed in operation. Referring to the figures, I have shown an electric motor 19, the casing of which is provided with a part 20, ordinarily called the base, which permits the motor to be attached to the under surface of the top in any suitable manner, such as indicated at 21. Within a suitable gear housing 22 is encased a gear upon the motor shaft which is adapted to mesh with a worm on the shaft 23. This casing is provided with the usual bearings whereby the shaft 23 may readily be supported.

The shaft 23 has secured thereto a beveled gear 29, which gear is adapted to mesh with the teeth of a bevel gear 30 secured to a shaft 31. This shaft 31 is substantially in right angular relationship to the shafts 23 and 25, and the said shaft 31 is suitably carried by journal brackets 32 and 33, the brackets being secured in any suitable manner to the bottom surface of the top 3. One end of said shaft carries a grooved wheel 34. The shaft 31 is provided with a longitudinally extended groove 35. Carried upon the shaft 31 is one member 36 of a "dog" clutch, which member is keyed by suitable means 37 to the shaft through the medium of a pin or the like 38 received within the groove 35. The keying aforesaid constitutes a simple splined connection. The other element 39 of the "dog" clutch includes a worm 40, this worm and "dog" clutch being adapted to rotate freely upon the shaft 35 when the two elements of the "dog" clutch are out of engagement as, for instance, illustrated in Figure 4.

The worm has an extension 41 carrying a pin 42, the pin being received in an annular slot 43 of the shaft 31. In this manner, the worm and "dog" clutch are at all times held in a defined position relative to the shaft 31. Secured to the bottom surface is a bracket 44 which carries a stud shaft, one end of which shaft is provided with a yoke or fork 45 having studs 46 received within an annular grooved collar 47 secured to the "dog" clutch member 36. The opposite end of the stud shaft has secured thereto a lever 48. It will be seen on viewing Figure 2 that the lever extends both below the bottom surface and above the upper surface of the top, and to this end, the top is provided with a transverse bore or opening 49, whereby the lever may be readily moved by engaging the lever above the top surface of the top. A short bracket 50 is positioned in line with the stud shaft and the lever 48 is provided with an outstanding pin 51 and between said pin and the bracket is a coil spring 52. The positioning is such that there is a toggle movement between the spring and the lever so that when the lever is swung in either one of two positions, it is held in the selected position by the spring.

A journal 53 secured to the bottom surface of the top carries a pinion 54, the teeth of which mesh with the teeth of the worm 40 (see Figure 2). On the same shaft that carries the pinion 54 is a grooved wheel 55.

It will be noted that the top is provided with a through bore in the plane of the grooved wheel at 56. Secured to the top surface at 76 is a pedestal 77, this pedestal being provided with a bearing portion carrying a shaft 78, one end of which shaft has secured thereto a spool 79, and the opposite end has fastened thereto a grooved wheel 80. This grooved wheel lies in the plane of the grooved wheel 55. A continuous belt 81 is adapted to be passed through the bore 58 and around the grooved wheels 55 and 80.

The dynamometer 5, as previously stated, is mounted upon the display board 1. This dynamometer is illustrated as to internal construction in Figures 5 and 6, wherein it will be seen that it is of the spring-actuated type. Referring to these two figures, I have provided a casing 82 having an interrupted flange 83, which flange is adapted to be fastened to the display board by any suitable means 84. The front wall of the casing 85 is adapted to carry the indicia shown in Figure 1, at 10 to 14, inclusive. Rearward of the front wall of the casing 85 is a framework 86 adapted to carry certain mechanism of the dynamometer, to wit, coil springs 87 and 88, both provided with a hook end as shown at 89 and 90, the hooks being passed through eyes in the shanks of members 91 and 92, the shanks having heads at 93 and 94. The shanks are passed through elongated slots contained in web portions 95 and 96, the heads 93 and 94 resting on the top of their respective web portions. The opposite ends of the coil springs 87 and 88 are secured to a cross bar 97 and in the manner illustrated at 98 and 99. Secured to the member 86 is a U-bracket 100 which in turn has secured thereto a Z bracket 101. The brackets 100 and 101 are adapted to support a shaft 102 passed therethrough, upon which shaft is mounted between legs of the brackets, a pinion 103. A rack 104 has the teeth thereof in engagement with the pinion 103. A link 105, provided with a bifurcated end 106, is adapted to have received between the bifurcations a portion of the rack 104, as see Figure 6, and the said rack, link, and cross bar 97 are all pinned together as shown at 107.

Carried on the shaft 102 and forward of the bracket 101 is a sleeve 108. This sleeve has fastened thereto an insulation member 109. This insulation member carries an arm 110, the head of which is recessed at 111 to receive a coil spring 112 and a movable brush 113. The spring normally urges the brush outwardly of the recess in the well understood manner.

An annular insulation ring 114 is secured to the member 86, as illustrated at 115, and said ring is provided with segmental contacts 116, 117, and 118. The brush 113 is adapted to sweep the different contacts when the sleeve 108 is rotated.

Mounted upon the sleeve 108 and forwardly of the top 85 is a pointer 119. Secured to the squared end of the shaft 102 so as to turn with said shaft is a member 120, and to the member 120 is secured an arm 121 provided with a T-end 122 formed with an elongated slot 123. The arm is secured to the pointer by means of a screw 124 received in a tapped opening in the pointer with the shank of the screw passed through the slot 123. In this manner, the arm may be locked to the pointer so that rotation of the shaft 102 will likewise produce rotation of the pointer. A cap 125, provided with a glass front 126, is adapted to cover the pointer and the dial, the dial being the surface carrying the indicia on the front wall 85.

It is obvious that if the link 105 was given a downward pull that the springs would be tensioned, and a sudden release of the link might cause damage to the dynamometer. To overcome any danger in this regard, I have provided the means shown at 127. This means includes a cylinder 128 within which is a piston 129 and a connecting rod 130 passed through the end cap 131 of the cylinder, the said rod having a flattened end 132 adapted to be secured to a lever 133 through the medium of a screw or the like 134. The opposite end of the cylinder is provided with a bracket 135, swingingly pinned at 136 to a bracket 137, the latter bracket being fastened to the rear surface of the display board, as illustrated at 138 in Figure 7. A valve 139 is arranged in the head of the cylinder, the valve including a screw, the shank 140 of which is longitudinally slotted at 141, with the threads of the shank in engagement with a nut 142 in said head. A coil spring 143 surrounds the shank and is interposed between the said nut 142 and the head 144 of the screw. Adjustment of this screw regulates the degree of opening of the slot to regulate the escape of air forward of the piston, in the well understood manner.

The lever 133 is passed through a slot in the display board and pivotally secured to said display board by means of a bracket 145. That end of the bracket forward of the front face of the display board is secured by means 146 to the link 105. This means 146 likewise has secured thereto a block 147 carrying a hook 148. The cord 6 shown in Figure 1 is adapted to be fastened to the hook and secured to the spool 79, as illustrated in said figure.

Figure 8 shows the wiring diagram, and it is to be observed that the motor 19 connects with a source of current supply, wires leading to which are shown at 149. This motor is in circuit with a rheostat 150, the rheostat constituting an element of the speed selector 18. The slide arm 151 of the speed selector is adapted to play over the resistance of the rheostat in the well understood manner and connects with the source of current supply through one of the wires 149. The brush or armature of the dynamometer has a lead 152 between it and the source of current supply and various leads 153, 154 and 155 connect with the segments 116, 117, and 118, and to the bulbs illustrated at 7, 8 and 9, with a common lead between the bulbs and the source of current supply, as shown at 156.

The speed selector is shown in plan in Figure 3 and the speed selector carries a segmental plate 157 having certain indicia indicative of miles per hour. A pointer 158 is adapted to play over this indicia to indicate any selected speed for the motor 19.

The operation, uses and advantages of the invention just described are as follows:

We may assume that the cord 6 is rove about the spool 79, with one end of said cord secured to the hook 148. In this position, the pointer of the dynamometer reads "Zero", as illustrated in Figure 1. When the handle of the speed indicator is turned, it will move the brush 151 over the coils from an "off" position to an "on" position, current from the source of current supply is fed to the motor, the motor in turn will rotate its shaft and the reduction gear which, in turn, drives the shaft 23, and this shaft through the bevel gears 29 and 30 will rotate the shaft 31, to drive belt 81 through grooved wheel 55 to in turn rotate spool 79. The parts will be in motion when the lever 48 is moved to the right, viewing Figure 2, to cause co-engagement between the two members of the "dog" clutch. When the "dog" clutch members co-engage by moving the lever 48 to the right, the spool 79 will start a slow rotation and a steady tension will be imposed upon the cord 6 and this cord will be drawn downwardly together with the hook 148 to cause rotation of the pointer 119 of the dynamometer. This pointer has previously been calibrated through the medium of the adjusting screw 124 so that when the dynamometer does not have any tension imposed upon the springs, the pointer will be at "zero" reading. As the spool 79 begins to rotate, the pointer will be moved over the graduations shown at 11 to indicate the "pounds pull" upon the cord 6. Obviously, a pull upon the cord 6 will tend to tension the springs 87 and 88, move the rack 104, and cause rotation of the commutator over the segments 116, and perhaps 117 and 118. A new cord should permit play of the pointer in the "safe" zone 14, and permit the green light to burn, as see the wiring diagram of Figure 8. If the cord is weak, it may break when the dynamometer pointer is in the zone 13, marked "Caution," at which time a yellow or amber light appears at 8.

If the cord 6 should suddenly break, the pneumatic retard 127 will operate so as to prevent rapid return of the coil springs from an extended position to the normal position illustrated in Figure 5.

In Figure 9, I have roughly illustrated by means of a chart a "safety," "caution" and "danger" zone with the ordinates in tensile strength of cord in pounds and in the abscissa the entire mileage in thousands. The results show that in a normal cord having a tensile strength of 17 to begin with, that the decrease in tensile strength in tire mileage is almost a straight line, although at tire mileage of 15,000 the line slopes less than the general slope for the first 15,000 miles. This chart has assumed that the tire has not been subjected to rough treatment but rather that the tire has actually been subjected to such wear as might occur when driven over pavement.

This apparatus may be made in various sizes and, in fact, may be made of such a size as to be readily portable. It may be set up where it may be readily viewed and an actual test given a cord from a used tire for the benefit of any one interested. As before pointed out in the introductory portion of the specification, a cord may be removed from a tire and fastened to the hook 148 and secured to the spool 79. The dynamometer will indicate the pounds pull on the cord prior to breakage. This pull may be comparatively rapid or slow, dependent upon the motor speed. For instance, if the motor speed is indicated at 50 miles per hour and the cord 6 should break when the dynamometer pointer indicates "caution," it is indicative that perhaps a disastrous blow-out of the tire might occur, resulting in accident.

With this device, the vehicle owner may drive into a tire service station, the tires may be removed from the car of the vehicle owner, a cord taken from each tire, and an actual test run upon the cords to determine the breaking point. This will indicate to the tire buyer, irrespective of the character of the tread, the condition of the tires and whether they are safe or not, and at what speed the car may be driven safely. In other words, if the motor is driven at a very rapid rate, say 50 miles per hour, before indicated, the cord 6 will be placed in tension at a more rapid speed and the likelihood of an early breakage of the cords at said speed readily ascertained.

I claim:

1. A demonstration device for determining the tensile strength of a cord of a pneumatic cord tire, including a dynamometer having a face graduated into a safety, caution and danger zones, a pointer, means for rotating said pointer for play over said zones and a cord under test being adapted for engagement with said means; a spool for engagement with said cord and about which said cord is to be wound to place said cord in tension, and a motor for turning said spool to progressively increase the tension on the cord until breakage thereof occurs.

2. A demonstration device for determining the tensile strength of a cord of a pneumatic cord tire, including a dynamometer having a face graduated into a safety, caution and danger zones, a pointer, means for rotating said pointer for play over said zones and a cord under test being adapted for engagement with said means; a spool for engagement with said cord and about which said cord is to be wound to place said cord in tension, a motor for turning said spool to progressively increase the tension on the cord until breakage thereof occurs, a series of differently colored lights, electrical connections between the dynamometer and said lights, and a means controlled by movement of said pointer to in turn control current flow through said electrical connections to said lights in accordance with the position of said pointer.

3. A demonstration device for determining the tensile strength of a cord of a pneumatic cord tire, including a dynamometer having a face graduated into a safety, caution and danger zones, a pointer, means for rotating said pointer for play over said zones and a cord under test being adapted for engagement with said means; a spool for engagement with said cord and about which said cord is to be wound to place said cord in tension, a motor, and clutch means between the spool and motor whereby the motor may be released from the spool if the cord under test breaks.

4. A demonstration device for determining the tensile strength of a cord of a pneumatic cord tire, including a dynamometer having a face graduated into a safety, caution and danger zones, a pointer, means for rotating said pointer for play over said zones and a cord under test being adapted for engagement with said means; a spool for engagement with said cord and about which said cord is to be wound to place said cord in tension, and retard means for the means for rotating the dynamometer pointer, whereby if the cord under tension breaks, the dynamometer pointer slowly returns to a selected position relative to the graduated face.

HERALD M. RUCH.